United States Patent [19]

Fredriksson

[11] Patent Number: 4,530,534
[45] Date of Patent: Jul. 23, 1985

[54] CONNECTION MEANS, PARTICULARLY FOR A SUSPENDED LOAD

[75] Inventor: Lars O. A. Fredriksson, Växjö, Sweden

[73] Assignee: K A Bergs Smide AB, Gemla, Sweden

[21] Appl. No.: 334,588

[22] Filed: Dec. 28, 1981

Related U.S. Application Data

[63] Continuation of Ser. No. 96,044, Nov. 20, 1979, abandoned.

[30] Foreign Application Priority Data

Nov. 30, 1978 [DE] Fed. Rep. of Germany ....... 2851708

[51] Int. Cl.³ .............................................. B66C 1/14
[52] U.S. Cl. ..................................... 294/82.11; 59/93; 294/74
[58] Field of Search ................... 294/74, 78 R, 78 A, 294/82 R; 24/197, 200, 265 AL, 265 BC; 59/85–88, 93

[56] References Cited

U.S. PATENT DOCUMENTS

| 3,224,185 | 12/1965 | Grim et al. | 294/74 X |
| 3,583,750 | 6/1971 | Norton | 294/74 |
| 3,685,285 | 8/1972 | Spilhaug | 59/93 X |
| 3,718,945 | 3/1973 | de Treglode | 294/74 X |
| 3,722,942 | 3/1973 | Baur | 294/74 |
| 3,837,697 | 9/1974 | Goodrich | 294/74 |
| 4,179,878 | 12/1979 | Albertini | 59/85 |

FOREIGN PATENT DOCUMENTS

| 2355548 | 5/1974 | Fed. Rep. of Germany | 294/74 |
| 2353946 | 5/1975 | Fed. Rep. of Germany | 294/78 R |

Primary Examiner—Johnny D. Cherry
Attorney, Agent, or Firm—Cohen, Pontani & Lieberman

[57] ABSTRACT

A connector, particularly for a suspended load, consists of a roundsling including a fibre bundle surrounded by a sleeve and at least one coupling member associated therewith, which comprises a substantially U-shaped U-bolt, into which the roundsling is in-hung, and a releasable bridge member which extends crosswise with respect to the in-hung roundsling and by means of which the shanks of the U-bolt are connected with each other. To harmonize the lifting capability of the connector and that of the roundsling and to obviate overloading of those fibres of the roundsling which are subjected to the greatest tension when the roundsling is loaded the cross section of at least that part of the circumferential area or peripheral surface of the coupling member which is engaged by the roundsling at normal load (the contact surface) has a radius $r_b$ of curvature which satisfies at least one of the conditions (1) $r_b \geq 5 + 0.3\, d_r$ or
(2) $r_b \geq 5 + 0.05\, u_r$, in which $d_r$ is the diameter of the cross sectional area of the fibre bundle of the roundsling and $u_r$ is the circumference of the sleeve of the roundsling and in which it is presumed that the fibres are unloaded and the cross-section of the roundsling is substantially circular. In the above mathematical expressions all dimensions are measured in mm.

8 Claims, 30 Drawing Figures

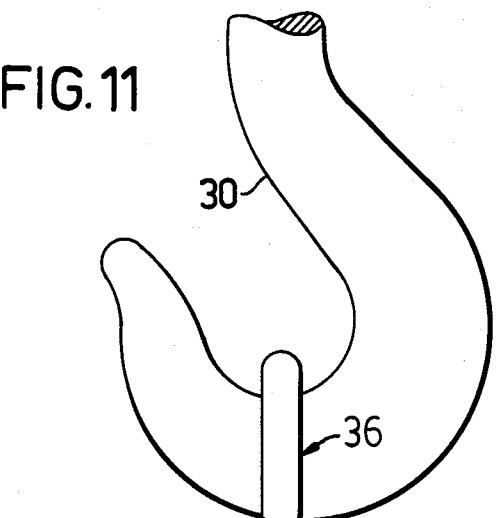
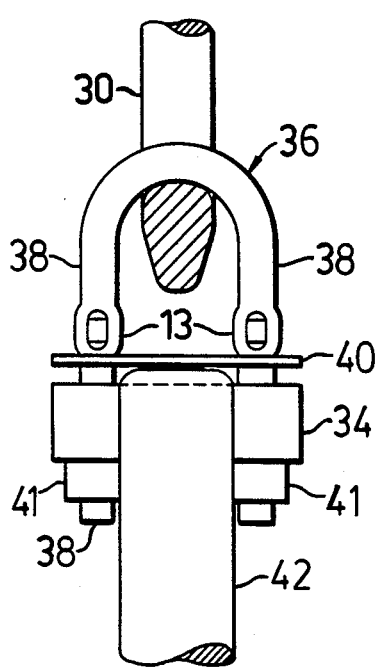
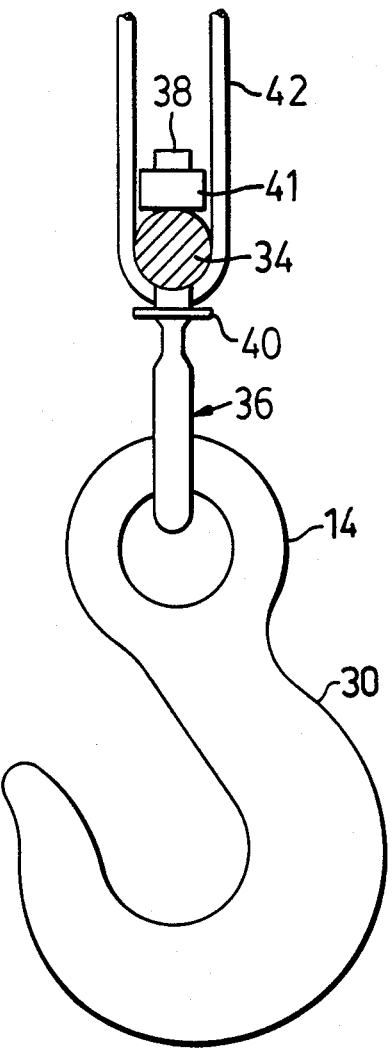

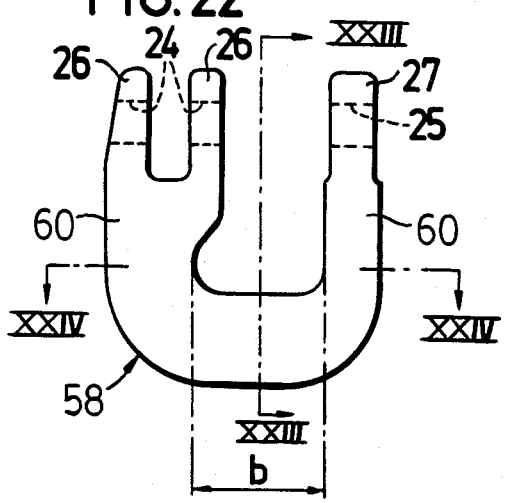
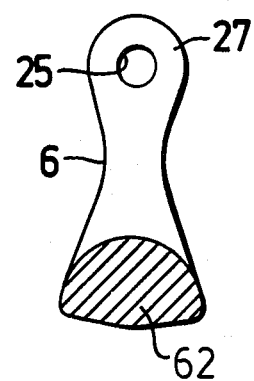
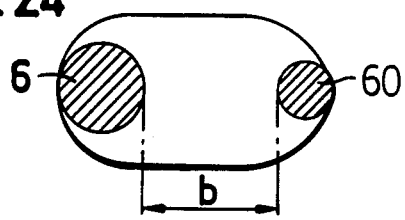
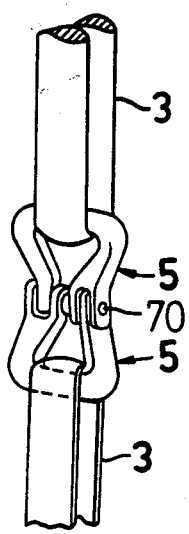
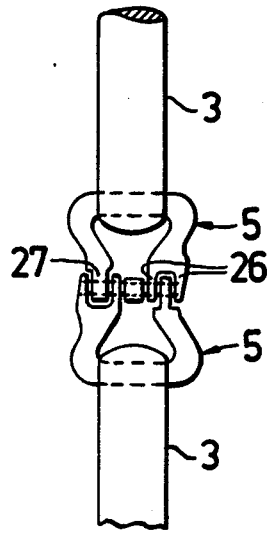

CONNECTION MEANS, PARTICULARLY FOR A SUSPENDED LOAD

This is a continuation of application Ser. No. 096,044, filed Nov. 20, 1979, now abandoned.

BACKGROUND OF THE INVENTION

This invention relates to a connection means, particularly for a suspended load, consisting of a roundsling and at least one coupling member associated therewith, which comprises a substantially U-shaped U-bolt and a releasable bridge member which extends crosswise with respect to the in-hung roundsling and by means of which the shanks of the U-bolt are connected with each other.

In connection with connection means of this kind, which are associated with conventional load hooks, coupling links, shackles and other coupling elements for lifting purposes, which have the same lifting capacity as such a roundsling, the drawback is encountered that all these parts have too small a radius of contact or curvature to allow their utilization together with the roundsling whereby its lifting capability at a predetermined safety factor is substantially reduced. This is elucidated with reference to FIGS. 1-6 of the annexed drawings. In FIG. 1 a roundsling of a well known kind is illustrated in cross section. The roundsling consists of a hank of at least one thread or the like which is made of one or more fibres 1 of polyester or the like which are wrapped together without interruption and united into an endless sling which is held together and protected by a tubular cover or sleeve 2. Even though known roundslings are alike in principle, their design varies a little. Such a roundsling is generally applied around a loed and is subsequently hung into a load hook at its utilization for lifting purposes. These roundslings have a drawback, since they cannot be applied around sharp edges or around parts having too small a radius, without entailing a considerable reduction of their lifting capacity.

Conventional load hooks, coupling members, shackles and other elements for lifting purposes which have the same lifting capability as such a roundsling have, however, too small a radius of contact or curvature to permit their utilization together with the roundsling without a considerable reduction of the lifting capability with maintained safety factor. This is illustrated in FIGS. 2-6.

FIGS. 2 and 3 illustrate in plan view and a partly cross-sectional view, respectively, the connection of the roundsling 3 to a U-bolt or shackle 20 having the same lifting capability as the roundsling.

FIGS. 4 and 5 illustrate in plan view and a partly cross-sectional view, respectively, the roundsling 3 being introduced into a conventional load hook 30 having the same lifting capability as the roundsling.

FIG. 6 illustrates the coupling of a roundsling 3 to a coupling member with the same lifting capability.

In everyone of the above, known cases the radius of contact, i.e. the radius of curvature of the surface (in the cross sectional plane of the coupling member determined by the roundsling), which is in contact with the roundsling, is too small. This is due to the fact that the most peripheral fibres of the sling are subjected to a considerably greater tension than the inner fibres, as is indicated by double-headed arrows e.g. in FIG. 3. These peripheral fibres therefore start rupturing first; after this weakening all other fibres, too, will soon rupture on account of overloading.

SUMMARY OF THE INVENTION

The primary object of the invention is to eliminate this drawback and to make possible a complete utilization of the lifting capability of the roundsling.

This object is attained thanks to the fact that the cross section of at least that part of the circumferential area or peripheral surface of the coupling member which is engaged by the roundsling at normal load (the contact surface) has a radius of curvature ($r_b$) which satisfies at least one of the conditions (1) $r_b \geq 5 + 0.3\, d_r$ and
(2) $r_b \geq 5 + 0.05\, u_r$, in which $d_r$ is the diameter of the cross sectional area of the fibre bundle of the roundsling and $u_r$ is the circumference of the sleeve of the roundsling and in which it is presumed that the fibre bundle is unloaded and occupies a circular cross-sectional area in the roundsling and that $r_b$, $d_r$ and $u_r$ are all counted in mm.

BRIEF DESCRIPTION OF THE DRAWINGS

Further features and advantages of the connection means according to the invention will become apparent from the following description and the annexed drawings.

In these drawings FIGS. 1-6 relate to connection means known in the art, as has become apparent already from the above, whereas FIGS. 7-30 illustrate exemplifying embodiments of the invention.

FIG. 7 is an exploded perspective view illustrating a first example of an embodiment of the connection means according to the invention (without roundsling).

FIG. 8 illustrates a complete, composite connection means according to the invention (with inhung roundsling).

FIG. 9 is a vertical cross sectional view on line IX—IX in FIG. 8.

FIG. 10 is a cross-sectional view corresponding to FIG. 9 of a modified embodiment.

FIG. 11 illustrates a connection means according to FIG. 10 hung into a load hook, partly in section.

FIG. 12 is a partly sectional side view corresponding to FIG. 11.

FIG. 13 illustrates a connection means according to FIG. 10 which is secured in the eye of a load hook.

FIG. 14 illustrates two roundslings which are each secured in an individual eye and in each of which a hook is secured by means of a coupling member in the form of a shackle according to the invention.

FIG. 15 is a side view of a modified coupling member associated with a roundsling (not shown).

FIG. 16 is a partial sectional view on line XVI—XVI in FIG. 15.

FIG. 17 is a side view of a shackle according to a third embodiment.

FIG. 18 is a partial sectional view on line XVIII—XVIII in FIG. 17.

FIG. 19 is a side view of a connection means according to the invention (without roundsling) according to a fourth embodiment, and part of a chain associated with the connection means.

FIG. 20 is a vertical sectional view on line XX—XX in FIG. 19.

FIG. 21 is a partial sectional view on line XXI—XXI in FIG. 19.

FIG. 22 is a side view of the U-bolt of the coupling member of the connection means according to a fifth embodiment of the invention.

FIG. 23 is a vertical sectional view on line XXIII—XXIII in FIG. 22.

FIG. 24 is a partial sectional view on line XXIV—XXIV in FIG. 22.

FIG. 25 is a side view of a connection means according to a sixth embodiment of the invention, a load hook being connected to the coupling member.

FIG. 26 illustrates the connection means as seen from the left in FIG. 25.

FIG. 27 is a perspective view of a connection means according to a seventh embodiment of the invention, a U-bolt, into which a load hook is hung, being connected to the coupling member.

FIG. 28 is a side view corresponding to FIG. 27.

FIG. 29 is a perspective view of a twin coupling member according to the invention, which interconnects two roundslings.

FIG. 30 is a side view corresponding to FIG. 29.

In all figures one and the same reference numeral always designates similar or analogous parts.

DESCRIPTION OF THE PREFERRED EMBODIMENTS

Figure 7:
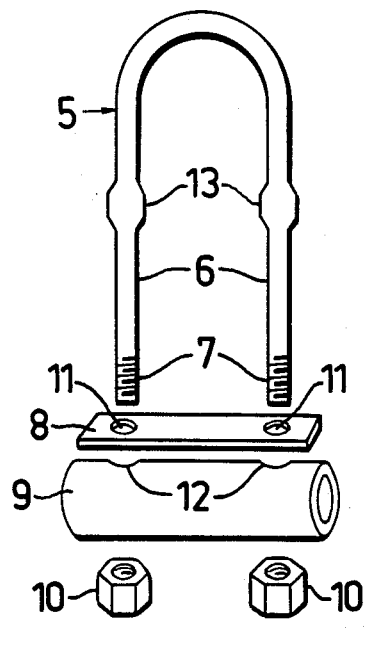
Figures 9, 10:
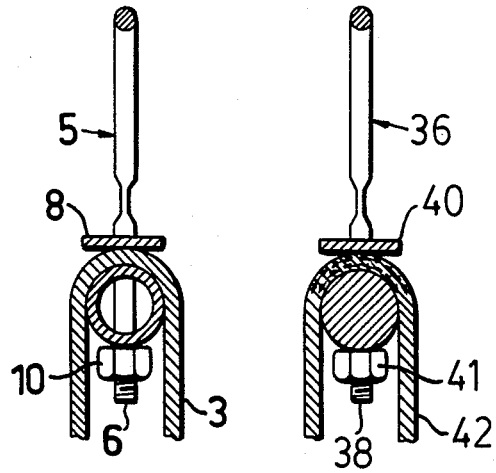
Figure 8:
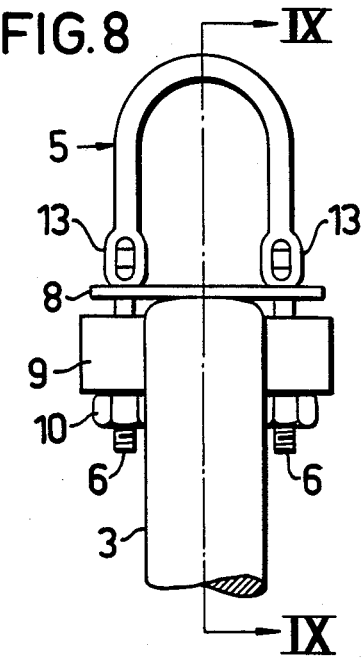

The connection means according to a first embodiment of the invention shown in FIGS. 7-9 comprises a substantially U-formed U-bolt 5, the shanks 6 of which are at least partly threaded, as in shown at 7.

In addition hereto the connection means comprises a fixation plate 8, a tubular bridge member 9 and two nuts 10 or other load transferring connection elements which cooperate with the threads 7 and which hold the bridge 9 on to the U-bolt 5. As is apparent particularly from FIG. 7, the fixation plate 8 and the bridge member 9 are each provided with a pair of openings 11 and 12, respectively, whose diameter is greater than that of the ends of the shanks 6 and whose mutual distance corresponds to the distance between the shanks 6 to enable the fixation plate 8 and the tubular bridge member 9 to be threaded onto the shanks 6. As is also apparent from FIG. 7 each of the shanks 6 has a thickened portion 13 which is located outside the bend of the U-bolt 5 and restricts the displacement inwards of the fixation plate 8. The purpose of the fixation plate 8 is to prevent the roundsling from bearing on the U-bolt, since the latter has too small a diameter. A U-bolt and a bridge member 9 associated therewith are herein jointly designated "coupling member".

Figure 1:
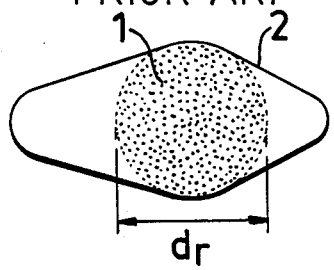
FIG. 1 is a cross sectional view through a roundsling known per se.

According to the invention the bridge member 9 has a radius of curvature which harmonizes with the corresponding or associated roundsling 43 and is sufficiently big not to entail any reduction of the strength. This is brought about by giving the cross section of at least that portion of the circumference of the bridge member which is engaged by the roundsling at normal load ("contact surface") a radius of curvature $r_b$ (in mm), which satisfies the equation $r_b \geq 5 + 0.3 \, d_r$, in which $d_r$ is the diameter (in mm) of the fibre part of the roundsling 3 when the fibres are unloaded and occupy a circular cross sectional area, as is shown in FIG. 1. Alternatively or additionally the radius $r_b$ (in mm) satisfies the condition $r_b \geq 5 + 0.05 \, u_r$, in which $u_r$ designates the circumference (in mm) of the cover of the roundsling 3 in its unloaded condition.

In a preferred embodiment of the invention at least that area of said circumferential portion of the bridge member 9, which is contacted by the roundsling (the contact surface), which is directed substantially towards the inner space of the U-bolt or shackle, has a substantially semi-circular cross section.

The shanks 6 of the U-bolt or shackle have preferably a substantially circular cross section. According to a further development of the invention the diameter $d_s$ in mm of the shank satisfies the condition $d_s = 1.2 \, r_b$.

To allow the fibres 1 to spread or expand sufficiently when the roundsling is loaded, the free space between the shanks 6 must not be too small. It has been determined that this free width b shall amount to at least $10 + 1.3 \, d_r$ (in mm). On the other hand this free width must not be too large either, since then the coupling member may tilt and occupy an oblique position at load, so that the roundsling 3 engages one of the shanks 6 instead of the bridge member 9. Said free width b which normally equals the width of the contact surface shall therefore preferably not be greater than $25 \times 2.5 \, d_r$ (in mm).

In FIG. 10 which illustrates a modification of the embodiment according to FIG. 9, as well as in FIGS. 11-13, the bridge member 34, which is tubular according to FIGS. 7-9, has been shaped as a homogenous rod with a homogeneous cross section.

FIGS. 11 and 12 show an example in which the connection means makes possible interconnection of the roundsling 42 and a load hook 30 having the same lifting capability as the roundsling 3.

Figure 2:
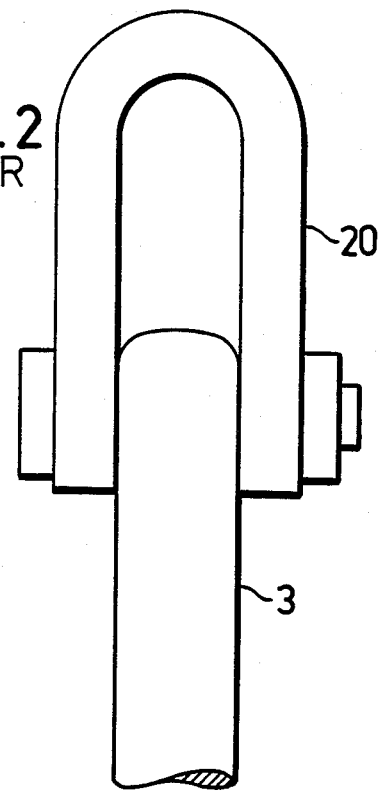
FIG. 2 is a diagrammatical plan view of a known shackle with inserted roundsling.
Figure 3:
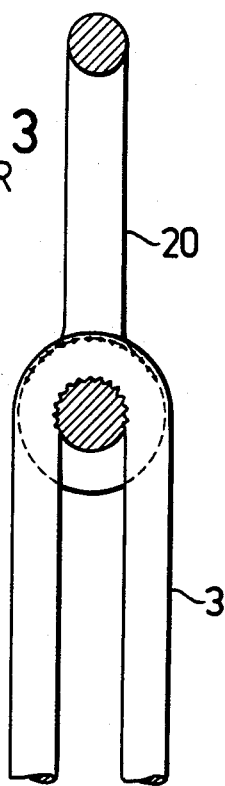
FIG. 3 is a partly sectional side view corresponding to FIG. 2.
Figure 4:
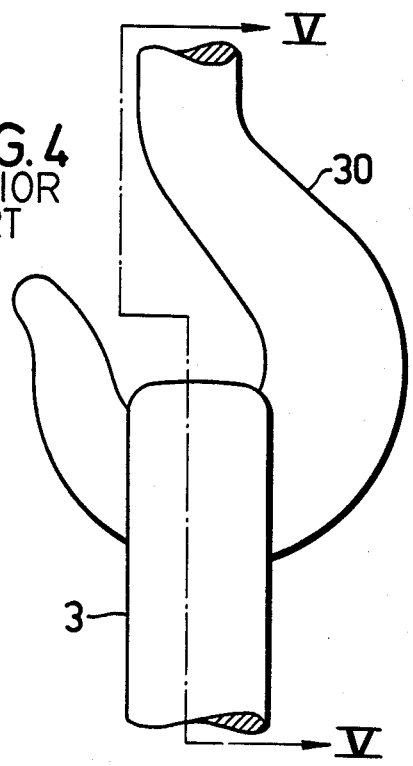
FIG. 4 illustrates a roundsling which is hung into a known load hook.
Figure 5:
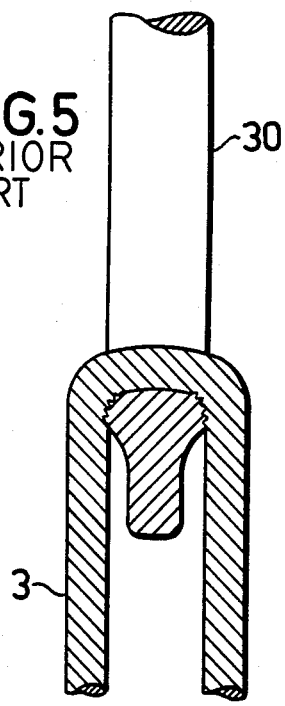
FIG. 5 is a sectional view on line V—V in FIG. 4.
Figure 6:
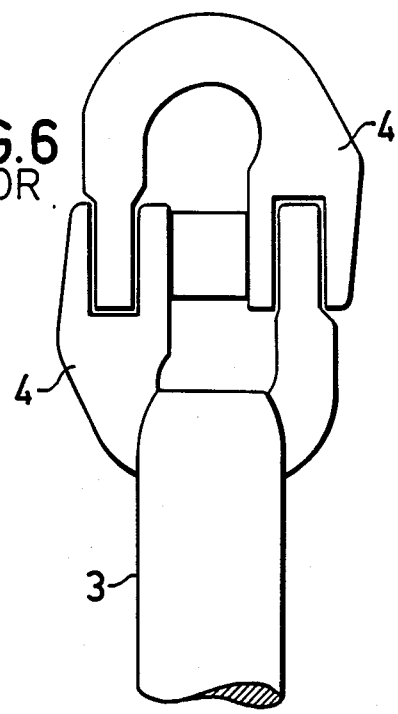
FIG. 6 illustrates a roundsling attached to a known coupling means.

FIG. 13 shows how a load hook 30 having an eye or opening 14 in its one end may be permanently connected to a roundsling 42 comprised in the connection member according to the invention without reduction of the lifting capability. The connection means according to FIG. 13 replaces the connection with a U-bolt or shackle according to FIGS. 2 and 3 or with a coupling member according to FIG. 6.

Figure 14:
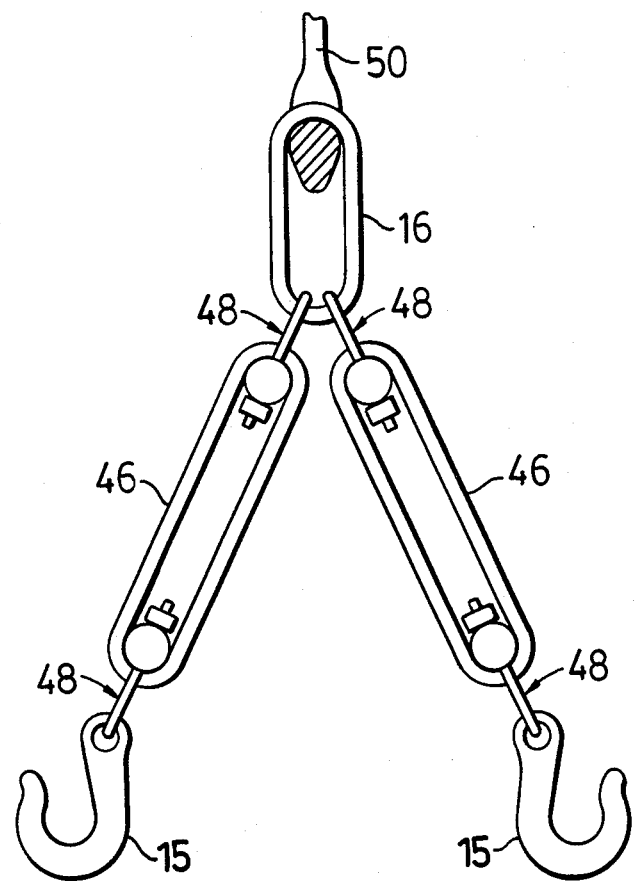

As a further example of the utilization of the connection means according to the invention FIG. 14 discloses a complete, forked lifting device which can be coupled to a connection means according to the invention. As is apparent from the Figure the device according to FIG. 14 comprises two end elements in the shape of hooks 15, each of which by means of a first coupling or shackle member are connected to a roundsling 46, each of which on their side by means of a second connection means 48 are coupled to a longish link 16 which is hung into a load hook 50. In this case the connection means according to the invention comprises one endless roundsling and two shackle members.

In FIGS. 15-16 and 17-18, respectively, in which the fixation plate 8 is not shown, there are illustrated two other types of the releasable connection between the shanks 6 and the bridge member 9.

Figure 15:
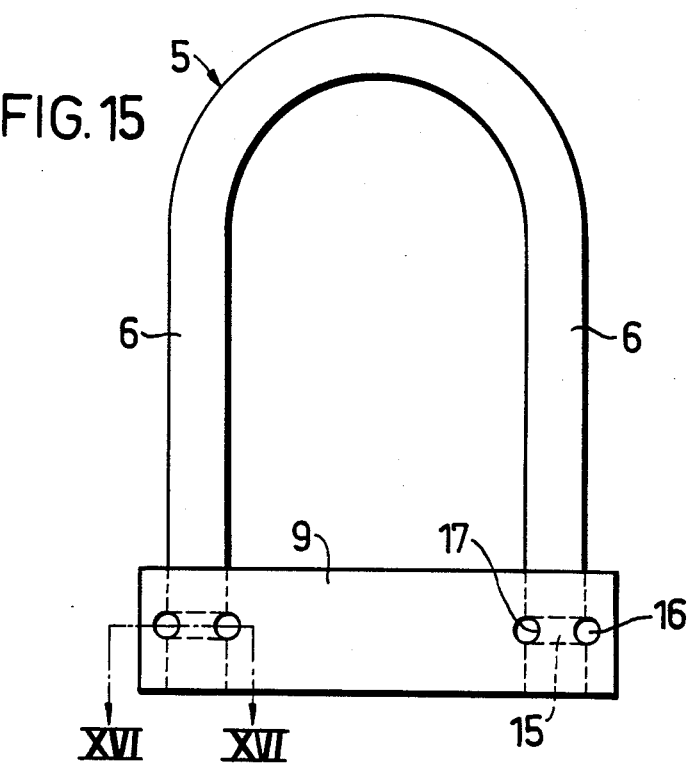
Figure 16:
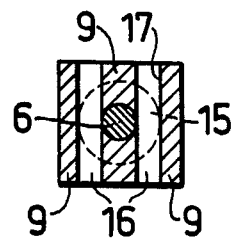

According to FIGS. 15–16 the ends of the shanks 6 are provided with angular grooves 15, which replace the threads 7 and into which pins 16 engage which are introduced into apertures 17 in the bridge member which extend crosswise with respect to the respective longitudinal directions of the bridge member 9 and the shanks 6.

Figure 17:
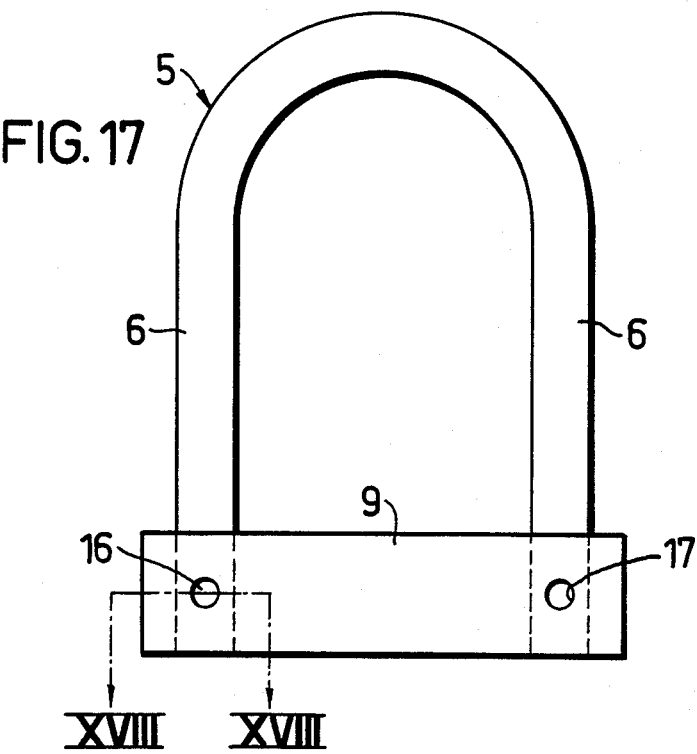
Figure 18:
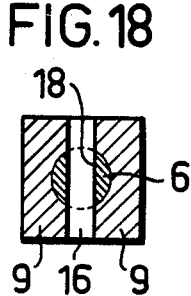

According to FIGS. 17–18 the grooves 15 shown in FIGS. 15–16 have been replaced by apertures 18 which preferably extend diametrically with respect to the shanks 6 and register with the apertures 17 of the bridge member 9.

Figure 19:
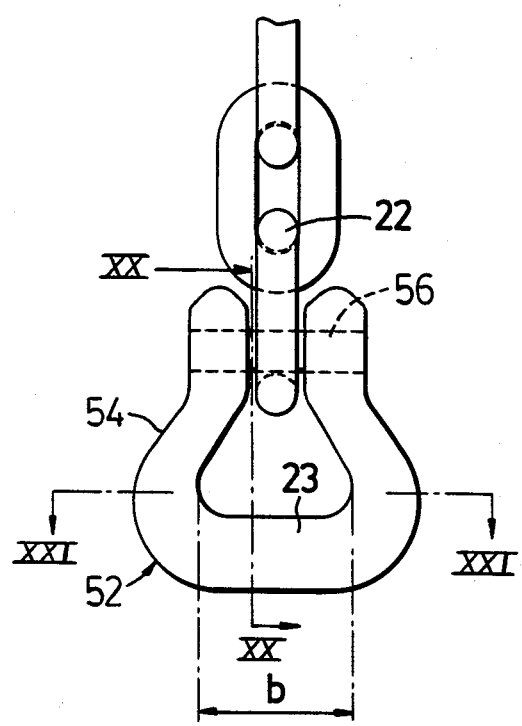
Figure 20:
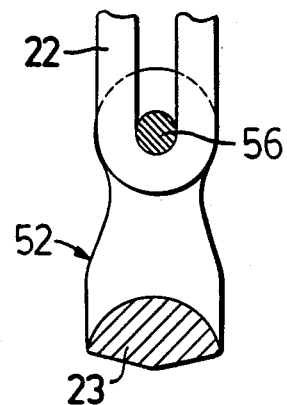
Figure 21:
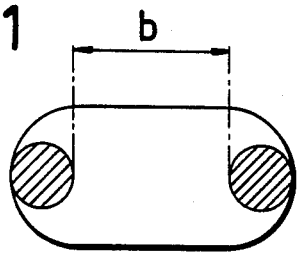

In the embodiment according to FIGS. 19–21 the coupling member of the connection means as before comprises a U-bolt 52 with two shanks 54 and a stud 56 which constitutes the bridge member and is secured in openings in the ends of the shanks. The stud 56 penetrates an end link 22 of a chain. A hook eye or a wire rope thimble could, of course, be substituted for the stud 56 within the scope of the invention.

The embodiment differs from that described above substantially in that the roundsling (not shown) is to be placed not around the bridge member 56 but around the central portion of yoke 23 of the U-bolt 52. The width b of the contact surface between the roundsling and the yoke which corresponds to the maximum free width between the shanks 54, should not be substantially less than 0.5 $u_r$. At least the upper portion of the yoke in FIG. 19 shall as before have a radius of curvature $r_b$, which satisfies at least one of the conditions defined above.

According to FIGS. 22–24 which illustrate a modification of the embodiment according to FIGS. 19–21, the end of one shank of the U-bolt 58 is bifurcated and comprises two tongues 26. They have each a through bore 24 which are coaxial mutually and with a corresponding through bore 25 in the end of the tongue 27 of the other shank 60. To complete the coupling member a bolt or stud (not shown), which forms the bridge member as in FIGS. 19–21, is to be introduced into the bores 24, 25 and to be secured in a suitable way. As in the embodiment according to FIGS. 19–21 the width b of the contact surface, which corresponds to the maximum free interspace between the shanks 60, and the radius of curvature $r_b$ of at least the upper or inner circumferential half of the yoke 62 shall satisfy the above condition to prevent damages to the inserted roundsling (not shown).

In FIGS. 25–30 there are illustrated examples of the utilization of a connection means having U-bolts of the kind shown in FIGS. 22–24. According to FIGS. 25–26 a load hook 30 is hung into the U-bolt 5 of a connection means according to the invention by means of a bridge member 9 having the form of a bolt or stud which passes through three tongues or the like which are formed on the hook and have mutually coaxial bores and are adapted to cooperate with the corresponding tongues of the U-bolt 66 or with similar, corresponding tongues of another coupling means.

Figure 25:
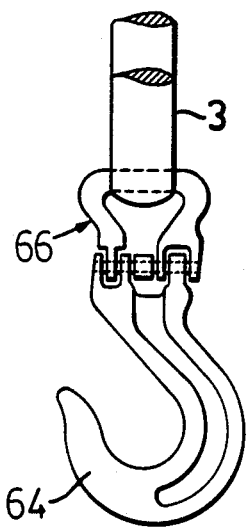
Figure 26:
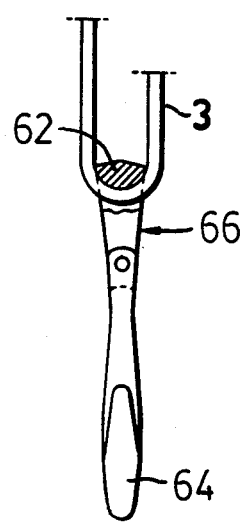
Figure 27:
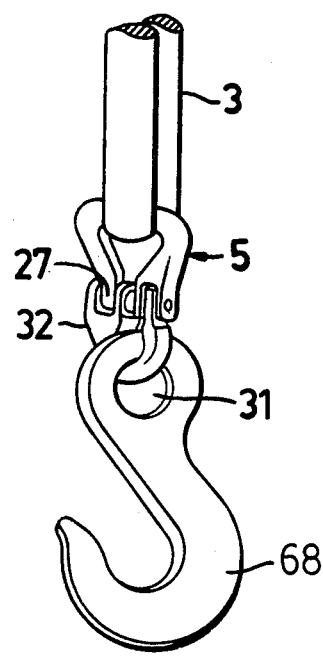
Figure 28:
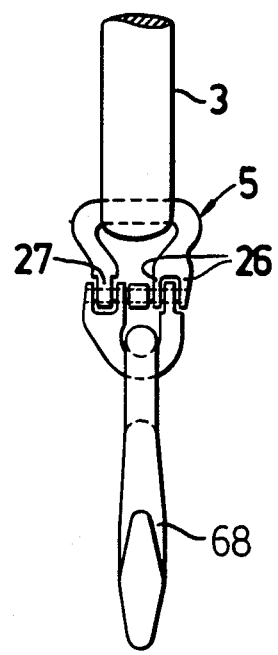

The embodiment according to FIGS. 27–28 differs from that shown in FIGS. 25–26 substantially therein that the hook 30 is provided with an eye 31 and connected to a connection means according to the invention through another coupling shackle 32 which is introduced into the eye 31 and is provided with tongues corresponding to the tongues 26, 27.

FIGS. 29–30 illustrate two exactly similar connection means, which have each a U-bolt of the kind shown in FIGS. 27–28, and a common bolt 70 which forms the bridge member of each connection means.

The U-bolts or shackles illustrated in FIGS. 22–30 as well as the hook according to FIGS. 25–26 constitute parts of a "building block set" whose common feature is constituted by the three apertured tongues, by means of which the "building blocks" can be interconnected in various combinations.

The embodiments described above and shown in the drawings are, of course, to be regarded merely as non-limiting examples. Thus, only that part of the circumference of the bridge member 9 or the shackle, which directly cooperates with the endless roundsling, may be more or less arcuate. Furthermore, other embodiments, which are also within the scope of the inventive concept, may be created by a combination of details taken from different ones of the above examples.

What I claim is:

1. A connection means for a suspended load which includes a roundsling that has a predetermined lifting capacity and comprises a fiber bundle encased in a sleeve, said connection means including a coupling member, said coupling member comprising a U-bolt and a removable bridge member extending between the shanks of said U-bolt to connect them to one another and having substantially the same lifting capacity as said roundsling, the portion of said bridge member between said U-bolt shanks being engageable by said roundsling for supporting said roundsling wherein the cross section of at least that part of the circumferential area of peripheral surface of the coupling member which is to be engaged by the roundsling at normal load has a radius of curvature ($r_b$) which satisfies at least one of the conditions (1) $r_b \geq 5 + 0.3\ d_r$
    (2) $r_b \geq 5 + 0.05\ U_r$ in which $d_r$ is the diameter of the cross sectional area of the fiber bundle of the roundsling and $U_r$ is the circumference of the sleeve of the roundsling and in which it is presumed that the fiber bundle is unloaded and occupies circular cross sectional area in the roundsling and that $r_b$, $d_r$ and $r_r$ are all measured in mm.

2. A connection means according to claim 1, wherein the engageable portion of said bridge member has a substantially semi-circular cross section, at least in that part of said circumferential area which is directed substantially towards the inner space of the U-bolt.

3. A connection means according to claim 1, wherein the maximum free inner space b (in mm) between the shanks of the U-bolt satisfies at least one of the following conditions:

(1) b is not smaller than $10 + 1.3\ d_r$ and not greater than $25 + 2.5\ d_r$ and
    (2) b is not less than about 0.3 $u_r$.

4. A connection means according to claim 11, wherein through openings, whose mutual distance equals the distance between the shanks and in which the shanks are introducable, are provided in said bridge member.

5. A connection means according to claim 1, further comprising a fixation plate having bores which register with the openings of said bridge member, and which is threaded upon the shanks of said U-bolt inside said bridge member, said shanks having widened or thickened portions which form inner abutments for said fixation plate.

6. A coupling member for at least one roundsling associated therewith, said roundsling having a predetermined lifting capacity and comprising a fiber bundle surrounded by a sleeve, said coupling member having substantially the same lifting capacity as said roundsling and comprising a U-bolt and a releasable bridge member which extends crosswise with respect to the shanks of the U-bolt and by means of which said shanks are interconnected, wherein the cross section of at least that part of the circumferential area or peripheral surface of the coupling member which is to be engaged by said associated roundsling at normal load has a radius of curvature which satisfies at least one of the conditions (1) $r_b = 5 + 0.3\ d_r$ and (2) $r_b \geqq 5 + 0.05\ u_r$ in which $d_r$ is the diameter of the cross sectional area of the fibre bundle of said associated roundsling and $u_r$ is the circumference of the sleeve of said roundsling and in which it is presumed that the fiber bundle is unloaded and occupies a circular cross sectional area in the roundsling and that $r_b$, $d_r$ and $u_r$ are counted in m.m.

7. A coupling member according to claim 6, wherein the end of one of the shanks of the U-bolt is forked and has two bores, which are substantially coaxial with each other and with a corresponding bore provided in the end of the other shank, which is unforked.

8. A coupling member according to claim 7, further comprising a chain accessory which has a pair of apertured tongue members for cooperation with said unforked shank end and a single apertured tongue member for cooperation with said forked shank end by means of said bridge member which passes through the bores in said shank ends and through said apertured tongue members.

* * * * *